United States Patent
Sawada et al.

(10) Patent No.: US 8,114,212 B2
(45) Date of Patent: Feb. 14, 2012

(54) POWDERY SILICA COMPOSITE PARTICLES AND PROCESS FOR PRODUCING THE SAME, SILICA COMPOSITE PARTICLE DISPERSION, AND RESIN COMPOSITION

(75) Inventors: Hideo Sawada, Aomori (JP); Katsuhiko Tsunashima, Tokyo (JP); Masashi Sugiya, Tokyo (JP)

(73) Assignees: Nippon Chemical Industrial Co., Ltd., Tokyo (JP); National University Corporation Hirosaki University, Hirosaki-shi, Aomori (JP)

( * ) Notice: Subject to any disclaimer, the term of this patent is extended or adjusted under 35 U.S.C. 154(b) by 225 days.

(21) Appl. No.: 12/367,212

(22) Filed: Feb. 6, 2009

(65) Prior Publication Data

US 2009/0203820 A1 Aug. 13, 2009

(30) Foreign Application Priority Data

Feb. 8, 2008 (JP) ................. 2008-028781
Aug. 20, 2008 (JP) ................. 2008-211294

(51) Int. Cl.
*C04B 14/04* (2006.01)
(52) U.S. Cl. ............ 106/481; 524/154; 252/182.14
(58) Field of Classification Search ............ 524/154
See application file for complete search history.

(56) References Cited

U.S. PATENT DOCUMENTS

| | | | |
|---|---|---|---|
| 6,080,885 A * | 6/2000 | Sugiya et al. ............ 560/222 |
| 2005/0169867 A1 * | 8/2005 | Horino et al. ............ 424/70.12 |
| 2006/0019098 A1 * | 1/2006 | Chan et al. ............ 428/403 |
| 2006/0127669 A1 * | 6/2006 | Kogoi et al. ............ 428/403 |
| 2007/0243382 A1 * | 10/2007 | Chan et al. ............ 428/403 |
| 2008/0221353 A1 * | 9/2008 | Tsunashima ............ 564/12 |
| 2009/0047518 A1 * | 2/2009 | Sawada et al. ............ 428/405 |

FOREIGN PATENT DOCUMENTS

WO 2007/105524 A1 9/2007

* cited by examiner

*Primary Examiner* — Jerry Lorengo
*Assistant Examiner* — Ross J Christie
(74) *Attorney, Agent, or Firm* — Westerman, Hattori, Daniels & Adrian, LLP

(57) ABSTRACT

Powdery silica composite particles obtained by a surface treatment step of adding acid or alkali to a reactant solution comprising: core silica particles of 5 to 200 nm in average particle size; alkoxysilane; a phosphonium salt ionic liquid represented by general formula (1);

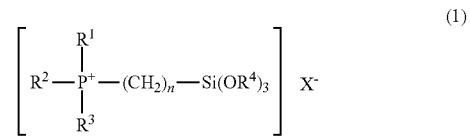

wherein $R^1$, $R^2$, and $R^3$ respectively represent a linear or branched alkyl group having 1 to 5 carbon atoms, $R^4$ represents a linear or branched alkyl group having 1 to 5 carbon atoms, n represents an integer of 1 to 8, and X represents an anionic group; and a reaction solvent such that the alkoxysilane is hydrolyzed, thereby surface-treating the core silica particles.

15 Claims, 8 Drawing Sheets

POWDERY SILICA COMPOSITE PARTICLES AND PROCESS FOR PRODUCING THE SAME, SILICA COMPOSITE PARTICLE DISPERSION, AND RESIN COMPOSITION

BACKGROUND OF THE INVENTION

1. Field of the Invention

The present invention relates to powdery silica composite particles comprising a phosphonium salt ionic liquid immobilized in the surface, a process for producing the same, and a silica composite particle dispersion and a resin composition comprising the silica composite particles.

2. Description of the Related Art

Ionic liquids are salts of cations and anions. They are substances that are in liquid state at room temperature and atmospheric pressure and have no melting points. Some of them have been studied in the electrochemical field since the early years of the 20th century. However, their other applications were not studied.

During the 1990s, ionic liquids came into the limelight amidst calls for green chemistry, because of their interesting properties such as incombustibility and nonvolatility. Therefore, various ionic liquids have been developed. In recent years, ionic liquids have been studied as to their use as incombustible, nonvolatile, and highly polar solvents.

However, applications of ionic liquids other than the use as solvents still remain to be developed, and novel applications thereof are expected for the future.

One possible novel application of ionic liquids is functional materials containing an ionic liquid. However, such functional materials containing an ionic liquid must be produced by uniformly dispersing the ionic liquid in various solvents or resin materials. However, ionic liquids, which are in liquid state, are disadvantageously exceedingly difficult to uniformly disperse in various solvents or resin materials.

Therefore, the present inventors have previously proposed powdery silica composite particles comprising an ionic liquid immobilized in the surface (see Japanese Patent Laid-Open No. 2007-270124 (claims)). The powdery silica composite particles disclosed therein can be dispersed uniformly in solvents or resins.

The powdery silica composite particles disclosed in Japanese Patent Laid-Open No. 2007-270124 (claims) are obtained by: adding acid or alkali to a reactant mixture comprising: a silica sol containing core silica particles of 5 to 200 μm in average particle size; alkoxysilane; and an ionic liquid such that the alkoxysilane is hydrolyzed; and centrifuging the obtained reaction suspension to precipitate solid matter. Therefore, in most cases, the silica composite particles are disadvantageously produced at yields as low as 50% or lower and immobilize thereon a phosphonium salt ionic liquid at a content of at most 0.6% by weight in terms of the P atom thus the amount of the phosphonium salt ionic liquid immobilized cannot be large.

Accordingly, an object of the present invention is to provide highly dispersible, powdery silica composite particles comprising a phosphonium salt ionic liquid immobilized in the surface and comprising the phosphonium salt ionic liquid at a high content. Another object of the present invention is to provide an industrially advantageous process capable of producing the powdery silica composite particles at high yields.

SUMMARY OF THE INVENTION

The present inventors have conducted diligent studies for attaining the objects and have consequently completed the present invention by finding that: (1) a reaction solution obtained by adding acid or alkali to a reactant solution comprising: a phosphonium salt ionic liquid represented by a particular general formula; core silica particles of 5 to 200 nm in average particle size; alkoxysilane; and a reaction solvent such that the alkoxysilane is hydrolyzed, is visually observed to have no solid matter and visually observed to have no precipitates even after being centrifuged, unlike a conventional reaction suspension; (2) powdery silica composite particles of interest can be obtained almost quantitatively by evaporatively removing the reaction solvent from the reaction solution; (3) the obtained powdery silica composite particles comprise the phosphonium salt ionic liquid at a high content; and (4) the powdery silica composite particles can be dispersed uniformly in various dispersion solvents or resin materials.

Specifically, a first aspect of the present invention provides powdery silica composite particles which are silica composite particles obtained by a surface treatment step of adding acid or alkali to a reactant solution comprising: core silica particles of 5 to 200 nm in average particle size; alkoxysilane; a phosphonium salt ionic liquid represented by the following general formula (1):

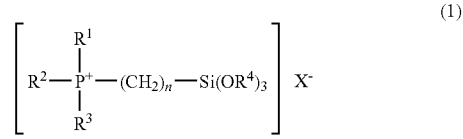

wherein $R^1$, $R^2$, and $R^3$ respectively represent a linear or branched alkyl group having 1 to 5 carbon atoms, $R^4$ represents a linear or branched alkyl group having 1 to 5 carbon atoms, n represents an integer of 1 to 8, and X represents an anionic group; and a reaction solvent such that the alkoxysilane is hydrolyzed, thereby surface-treating the core silica particles.

A second aspect of the present invention provides a process for producing powdery silica composite particles, which comprises a surface treatment step of adding acid or alkali to a reactant solution comprising: core silica particles of 5 to 200 nm in average particle size; alkoxysilane; a phosphonium salt ionic liquid represented by the following general formula (1):

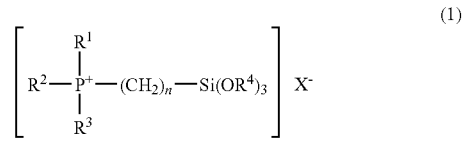

wherein $R^1$, $R^2$, and $R^3$ respectively represent a linear or branched alkyl group having 1 to 5 carbon atoms, $R^4$ represents a linear or branched alkyl group having 1 to 5 carbon atoms, n represents an integer of 1 to 8, and X represents an anionic group; and a reaction solvent such that the alkoxysilane is hydrolyzed, thereby surface-treating the core silica particles.

A third aspect of the present invention provides a silica composite particle dispersion comprising the powdery silica composite particles of the first aspect dispersed in a dispersion solvent.

A fourth aspect of the present invention provides a resin composition comprising the powdery silica composite particles of the first aspect.

The present invention can provide highly dispersible, powdery silica composite particles comprising a phosphonium salt ionic liquid immobilized in the surface and comprising the phosphonium salt ionic liquid at a high content. According to the present invention, the powdery silica composite particles can be produced almost quantitatively at high yields by an industrially advantageous process.

DETAILED DESCRIPTION OF THE PREFERRED EMBODIMENTS

Figure 1:
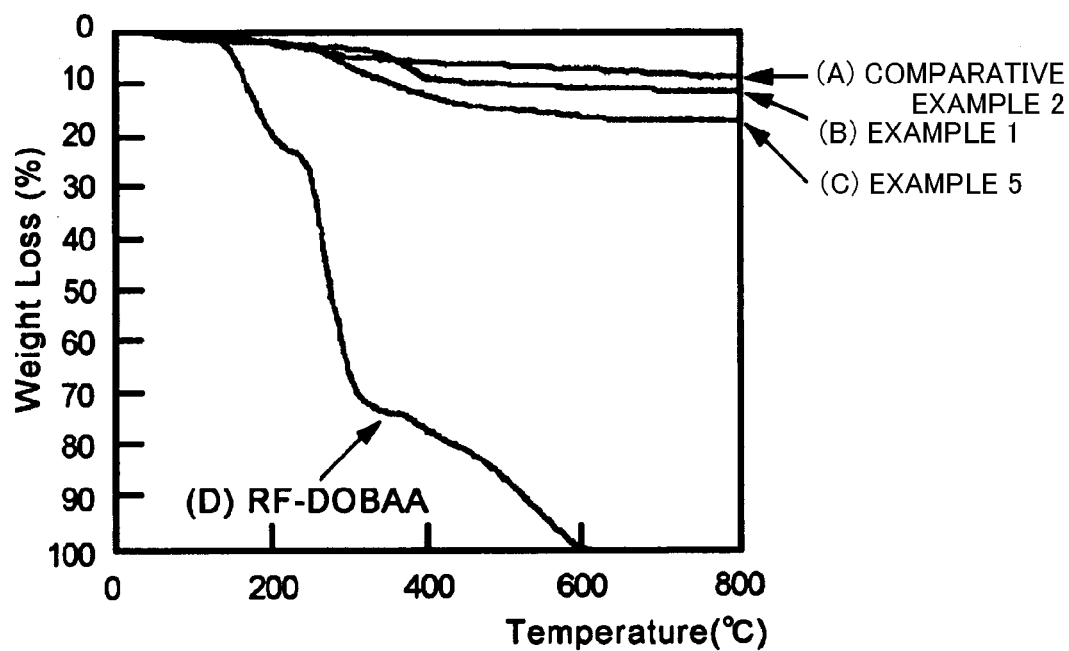
FIG. 1 shows thermogravimetric analysis results of silica composite particles obtained in Examples 1 and 5 and untreated silica particles (Comparative Example 2)
Figure 2:
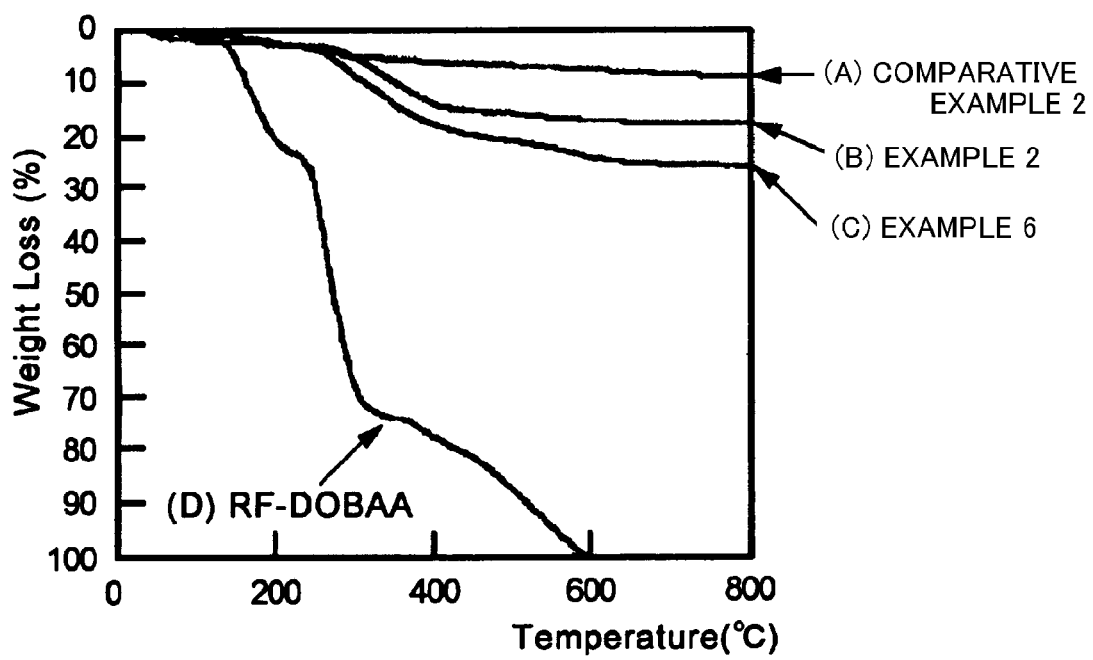
FIG. 2 shows thermogravimetric analysis results of silica composite particles obtained in Examples 2 and 6 and untreated silica particles (Comparative Example 2)
Figure 3:
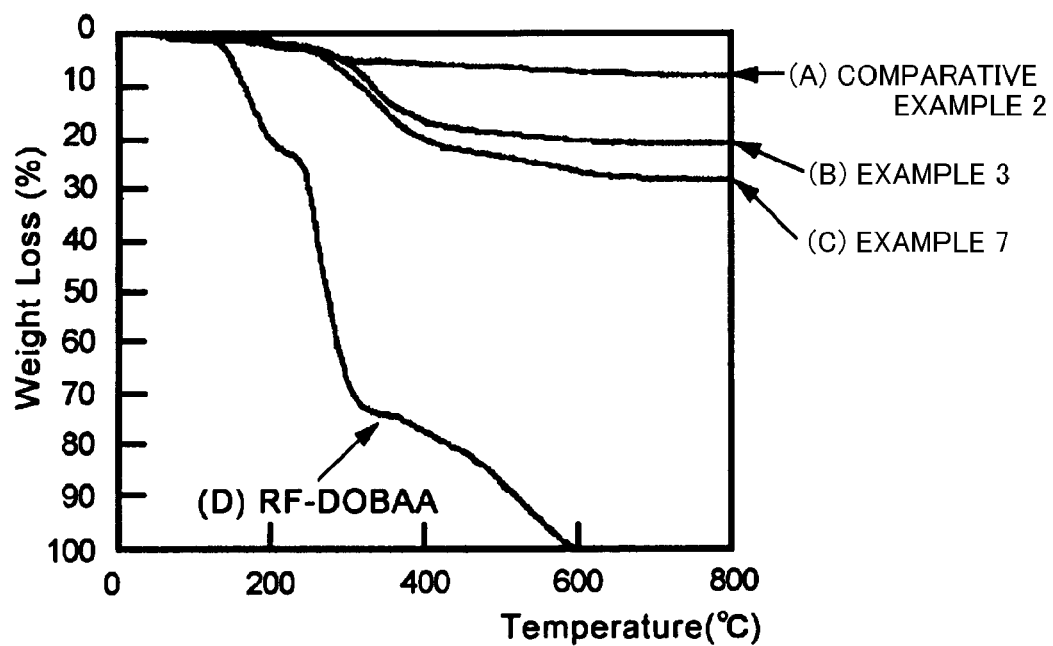
FIG. 3 shows thermogravimetric analysis results of silica composite particles obtained in Examples 3 and 7 and untreated silica particles (Comparative Example 2)
Figure 4:
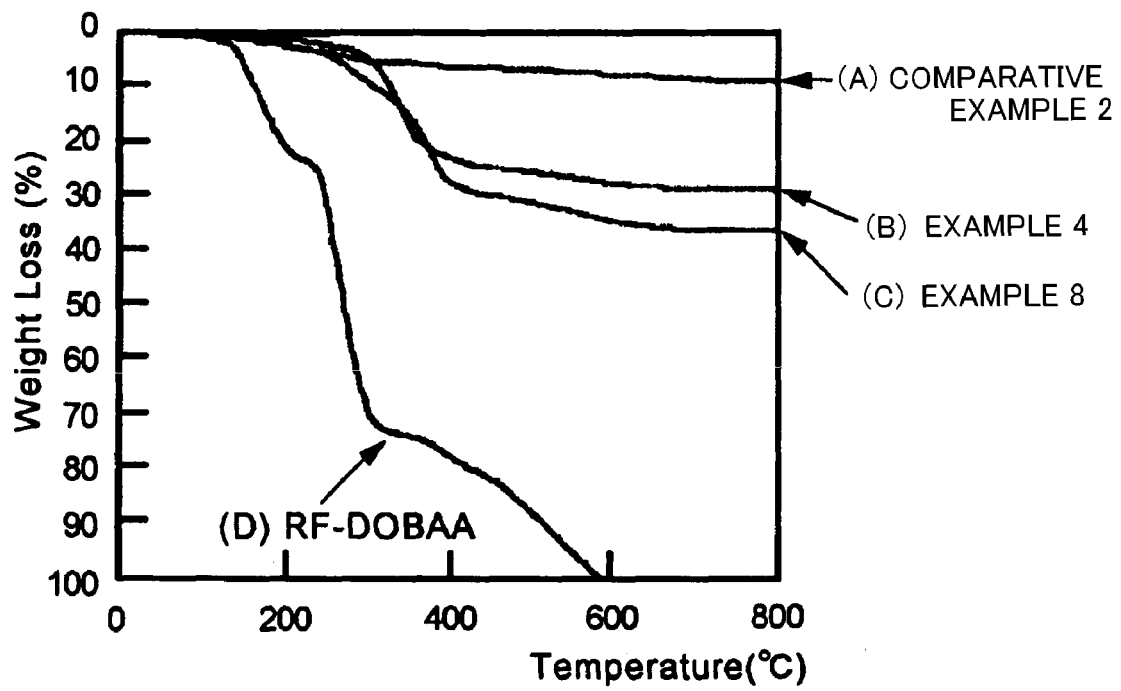
FIG. 4 shows thermogravimetric analysis results of silica composite particles obtained in Examples 4 and 8 and untreated silica particles (Comparative Example 2)
Figure 5:
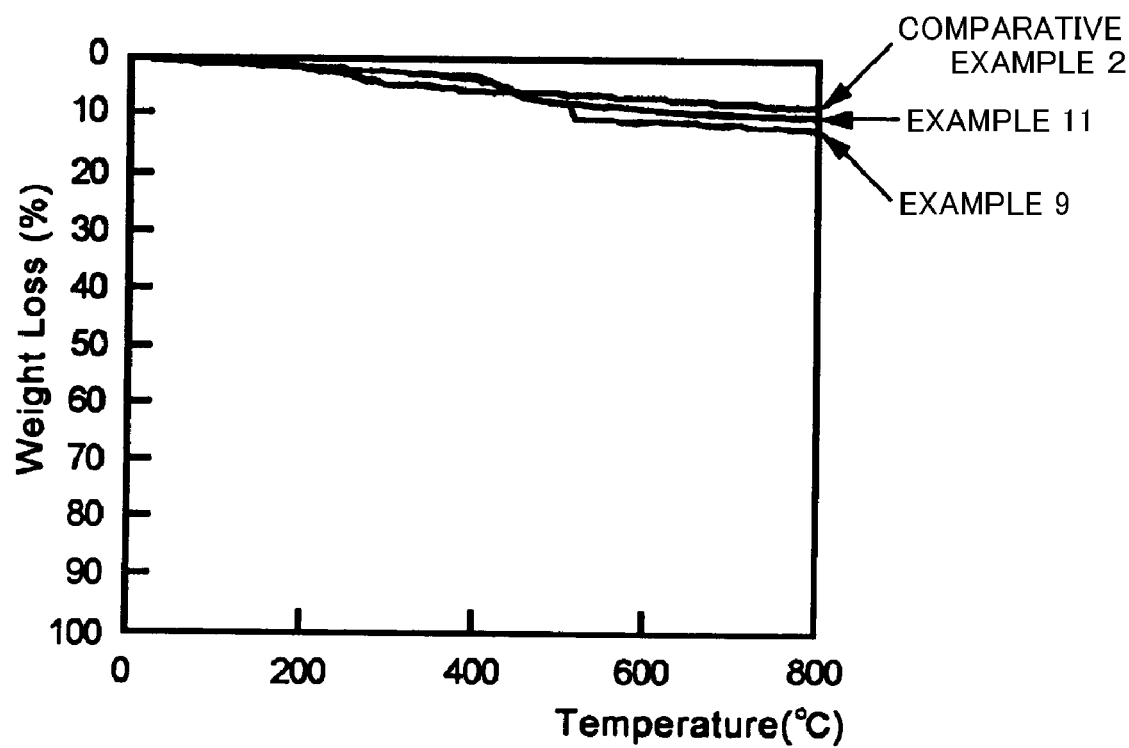
FIG. 5 shows thermogravimetric analysis results of silica composite particles obtained in Examples 9 and 11.
Figure 6:
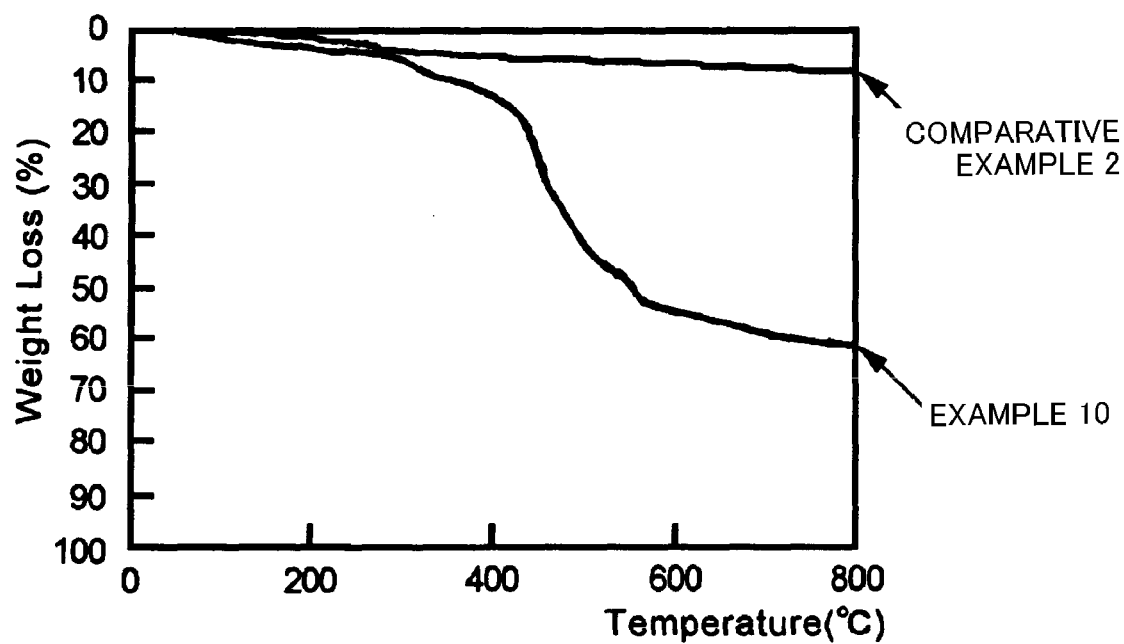
FIG. 6 shows thermogravimetric analysis results of silica composite particles obtained in Example 10.

Hereinafter, the present invention will be described based on the preferable embodiments thereof.

Powdery silica composite particles of the present invention are silica composite particles obtained by a surface treatment step of adding acid or alkali to a reactant solution comprising: core silica particles of 5 to 200 nm in average particle size; alkoxysilane; a phosphonium salt ionic liquid represented by the following general formula (1):

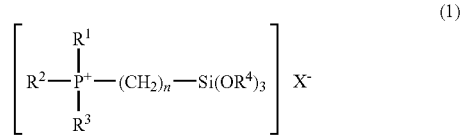

(1)

wherein $R^1$, $R^2$, and $R^3$ respectively represent a linear or branched alkyl group having 1 to 5 carbon atoms, $R^4$ represents a linear or branched alkyl group having 1 to 5 carbon atoms, n represents an integer of 1 to 8, and X represents an anionic group; and
a reaction solvent such that the alkoxysilane is hydrolyzed, thereby surface-treating the core silica particles.

The core silica particles used in the surface treatment step are silica particles of 5 to 200 nm in average particle size. Examples of a source of the core silica particles used in the surface treatment step include a silica sol containing silica particles of 5 to 200 nm in average particle size. Examples of the silica sol containing the core silica particles used in the surface treatment step include a hydrophilic solvent/silica sol and a hydrophobic solvent/silica sol. A methanol, ethanol, or isopropyl alcohol sol is preferable in terms of easy production thereof. The methanol sol may be a commercially available product. The hydrophobic solvent/silica sol may be prepared by the solvent displacement of an aqueous silica sol. The core silica particles in the silica sol are silica particles composed of $SiO_2$. The content of the core silica particles in the silica sol is not particularly limited and is preferably 1 to 80% by weight, particularly preferably 3 to 50% by weight. For example, the silica sol containing the core silica particles used in the surface treatment step is added to the reaction solvent used in the surface treatment step to obtain a reactant solution containing core silica particles of 5 to 200 nm in average particle size.

A silica source for the core silica particles used in the surface treatment step is not particularly limited and may be produced, for example, by particle growth from sodium silicate or an active silicic acid solution or using an organic silicon compound as a raw material or may be fumed silica.

The core silica particles used in the surface treatment step have an average particle size of 5 to 200 nm, preferably 5 to 50 nm. The average particle size of the core silica particles within this range permits favorable dispersibility of the silica composite particles in dispersion solvents or resin materials. On the other hand, an average particle size of the core silica particles smaller than 5 nm makes it difficult to produce or industrially obtain a silica sol containing them. Alternatively, an average particle size thereof exceeding 200 nm reduces the dispersion stability of the silica composite particles. The core silica particles can be measured by dynamic light scattering. In the present invention, DLS-6000HL manufactured by Otsuka Electronics Co., Ltd. is used in the measurement.

Examples of the alkoxysilane used in the surface treatment step include: tetraalkoxysilane such as tetramethoxysilane and tetraethoxysilane; alkyltrialkoxysilane such as methyltrimethoxysilane and methyltriethoxysilane; dialkyldialkoxysilane such as dimethyldimethoxysilane and dimethyldiethoxysilane; and alkoxytrialkylsilane such as hexyloxytrimethylsilane. The alkyl group in these alkoxysilanes is preferably of 1 to 6 carbon atoms in length. The alkoxy group therein is also preferably of 1 to 6 carbon atoms in length. Of them, tetraethoxysilane or tetramethoxysilane is preferable in terms of easy handling in production. These alkoxysilanes may be used alone or in combination of two or more of them.

The phosphonium salt ionic liquid represented by the general formula (1) used in the surface treatment step is a phosphonium salt and is an ionic liquid. In the general formula (1), $R^1$, $R^2$, and $R^3$ are respectively a linear or branched alkyl group having 1 to 5 carbon atoms and specifically include methyl, ethyl, propyl, butyl, and pentyl groups. Among them, a butyl group is particularly preferable. $R^1$, $R^2$, and $R^3$ may be the same or different. In the general formula (1), $R^4$ is a linear or branched alkyl group having 1 to 5 carbon atoms and specifically includes methyl, ethyl, propyl, butyl, and pentyl groups. Among them, a methyl group is particularly preferable. In the general formula (1), n is an integer of 1 to 8, preferably 3. In the general formula (1), X represents an anionic group. Examples of the anionic group represented by X include anionic groups such as fluorine ions, chlorine ions, bromine ions, iodine ions, $BF_4^-$, $PF_6^-$, $N(SO_2CF_3)_2^-$, $PO_2(OMe)_3^-$, $PS_2(OEt)_2^-$, and $(CO_2Me)_2PhSO_3^-$. Among them, chlorine ions are particularly preferable.

The reaction solvent used in the surface treatment step dissolves therein the alkoxysilane and the phosphonium salt ionic liquid represented by the general formula (1) used in the surface treatment step. Examples of the reaction solvent used in the surface treatment step include lower alcohols such as methanol, ethanol, and isopropyl alcohol. Among them, methanol is particularly preferable.

In the surface treatment step, the reactant solution may be prepared by mixing the silica sol containing the core silica particles, the alkoxysilane, and the phosphonium salt ionic liquid represented by the general formula (1) in any order without particular limitations into the reaction solvent.

The content of the core silica particles in the reactant solution is not particularly limited and is preferably 1 to 80% by weight, particularly preferably 3 to 50% by weight. The content of the core silica particles within this range in the reactant solution permits high dispersion stability of the silica composite particles.

The content of the alkoxysilane in the reactant solution is 0.05 to 1.5 ml, preferably 0.08 to 1.05 ml, per g of the core silica particles. The content of the alkoxysilane within this range in the reactant solution allows the powdery silica composite particles to comprise the phosphonium salt ionic liquid represented by the general formula (1) at a high content. When a content of the alkoxysilane in the reactant solution is lower than ml per g of the core silica particles, the resultant powdery silica composite particles tend to comprise the phosphonium salt ionic liquid represented by the general formula (1) at a low content. Alternatively, a content of the alkoxysilane exceeding 1.5 ml tends to reduce the dispersion stability of the silica composite particles.

The content of the phosphonium salt ionic liquid represented by the general formula (1) in the reactant solution is 0.03 ml or higher, preferably 0.03 to 1.5 ml, particularly preferably 0.03 to 0.45, further preferably to 0.3 ml, per g of the core silica particles. The content of the phosphonium salt ionic liquid represented by the general formula (1) within this range in the reactant solution allows the powdery silica composite particles to comprise the phosphonium salt ionic liquid at a high content. When a content of the phosphonium salt ionic liquid represented by the general formula (1) in the reactant solution is lower than 0.03 ml per g of the core silica particles, the resultant powdery silica composite particles tend to comprise the phosphonium salt ionic liquid at a low content.

In the present invention, the reactant solution used in the surface treatment step can further comprise a fluoroalkyl group-containing oligomer represented by the following general formula (2) or (3):

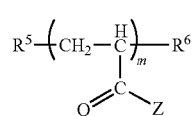

(2)

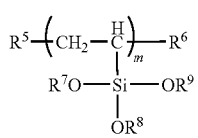

(3)

wherein $R^5$ and $R^6$ which may be the same or different represent a —$(CF_2)p$-Y group or —$CF(CF_3)$—$[OCF_2CF(CF_3)]q$-$OC_3F_7$ group wherein Y represents a hydrogen, fluorine, or chlorine atom, and p and q are respectively an integer of 0 to 10, Z represents a hydroxyl, morpholino, tertiary amino, or secondary amino group, $R^7$, $R^8$, and $R^9$ which may be the same or different represent a linear or branched alkyl group having 1 to 5 carbon atoms, and m is an integer of 5 to 1000. The reactant solution further comprising the fluoroalkyl group-containing oligomer represented by the general formula (2) or (3) allows the powdery silica composite particles of the present invention to comprise the fluoroalkyl group-containing oligomer represented by the general formula (2) or (3) in the surface. The powdery silica composite particles of the present invention comprising the fluoroalkyl group-containing oligomer represented by the general formula (2) or (3) in the surface can be more highly dispersible in various dispersion solvents or resin materials and also have properties such as oil repellency. In the general formula (2) or (3), $R^5$ and $R^6$ which may be the same or different represent a —$(CF_2)p$-Y group or —$CF(CF_3)$—$[OCF_2CF(CF_3)]q$-$OC_3F_7$ group wherein Y represents a hydrogen, fluorine, or chlorine atom, and p and q are respectively an integer of 0 to 10. In the general formula (2) or (3), Z represents a hydroxyl, morpholino, tertiary amino, or secondary amino group. Examples of the tertiary amino group include trimethylamino and triethylamino groups. Examples of the secondary amino group include —$NHC(CH_3)_2CH_2COCH_3$ and —$NHCH(CH_3)_2$ groups. In the general formula (2) or (3), $R^7$, $R^8$, and $R^9$ which may be the same or different represent a linear or branched alkyl group having 1 to 5 carbon atoms. In the general formula (2) or (3), m represents an integer of 5 to 1000.

The content of the fluoroalkyl group-containing oligomer represented by the general formula (2) or (3) in the reactant solution is preferably 0.03 to 1 g, particularly preferably 0.04 to 0.6 g, per g of the core silica particles. The content of the fluoroalkyl group-containing oligomer represented by the general formula (2) or (3) within this range in the reactant solution permits high dispersibility of the silica composite particles in various dispersion solvents or resin materials.

The fluoroalkyl group-containing oligomer represented by the general formula (2) is produced with reference to methods described in, for example, Japanese Patent Laid-Open Nos. 11-246573, 2001-253919, and 2000-309594.

One of production examples thereof will be shown below. The fluoroalkyl group-containing oligomer represented by the general formula (2) is obtained by reacting raw materials comprising: a fluoroalkanoyl peroxide compound represented by the following general formula (4):

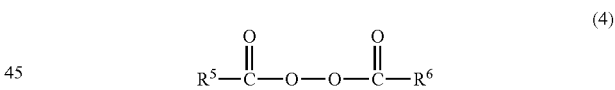

(4)

wherein $R^5$ and $R^6$ are the same as $R^5$ and $R^6$ in the general formula (2); and a vinyl group-containing compound represented by the following general formula (5):

(5)

wherein Z is the same as Z in the general formula (2) according to the following reaction formula (6):

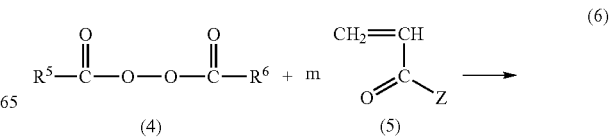

(6)

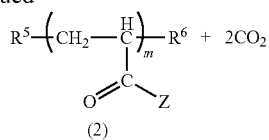

$$R^5\text{---}(CH_2\text{---}\underset{\underset{Z}{\overset{O}{\overset{\|}{C}}}}{\overset{H}{\underset{|}{C}}})_m\text{---}R^6 + 2CO_2 \quad (2)$$

Specific examples of the fluoroalkanoyl peroxide compound represented by the general formula (4) include diperfluoro-2-methyl-3-oxahexanoyl peroxide, diperfluoro-2,5-dimethyl-3,6-dioxanonanoyl peroxide, diperfluoro-2,5,8-trimethyl-3,6,9-trioxadodecanoyl peroxide, diperfluorobutyryl peroxide, diperfluoroheptanoyl peroxide, and diperfluorooctanoyl peroxide. The fluoroalkanoyl peroxide compound represented by the general formula (4) is obtained according to a production process known in the art and is obtained easily, for example, by reacting fluoroalkyl group-containing acyl halide with hydrogen peroxide in the presence of alkali (e.g., sodium hydroxide, potassium hydroxide, potassium bicarbonate, sodium carbonate, or potassium carbonate) in a fluorine-containing aromatic solvent or fluorine-containing aliphatic solvent (e.g., chlorofluorocarbon substitutes).

Specific examples of the vinyl group-containing compound represented by the general formula (5) include acrylic acid, methacrylic acid, N-methylmethacrylamide, N-methylacrylamide, N-ethylmethacrylamide, N-ethylacrylamide, N-isopropylmethacrylamide, N-isopropylacrylamide, N-n-propylmethacrylamide, N-n-propylacrylamide, N-isobutylmethacrylamide, N-isobutylacrylamide, N-n-butylmethacrylamide, N-n-butylacrylamide, N,N-dimethylmethacrylamide, N,N-dimethylacrylamide, N,N-diethylmethacrylamide, N,N-diethylacrylamide, N,N-diisopropylmethacrylamide, N,N-diisopropylacrylamide, N-acryloylmorpholine, and N-methacryloylmorpholine.

Examples of a method for reacting the fluoroalkanoyl peroxide compound represented by the general formula (4) with the vinyl group-containing compound represented by the general formula (5) include a method which comprises: dissolving the vinyl group-containing compound represented by the general formula (5) in an inactive solvent; subsequently mixing the solution with the fluoroalkanoyl peroxide compound represented by the general formula (4) with stirring; and then heating the mixture to 40 to 50° C. for aging, followed by purification.

The fluoroalkyl group-containing oligomer represented by the general formula (3) can be produced, for example, by reacting trialkoxysilane (e.g., trimethoxyvinylsilane) with fluoroalkanoyl peroxide (see e.g., Japanese Patent Laid-Open No. 2002-338691).

In the surface treatment step, the acid or alkali added to the reactant solution may be, without particular limitations, any acid or alkali that allows the alkoxysilane to be hydrolyzed. Examples of the alkali include ammonium hydroxide, sodium hydroxide, and potassium hydroxide. Examples of the acid include sulfuric acid, hydrochloric acid, nitric acid, and acetic acid. Ammonium hydroxide or hydrochloric acid is preferable in terms of high reactivity. Ammonium hydroxide is particularly preferable.

The acid or alkali added to the reactant solution is mixed therewith in an amount selected appropriately without particular limitations. The alkoxysilane in the mixture of the reactant solution with the acid or alkali is hydrolyzed at a reaction temperature of −5 to 50° C., preferably 0 to 30° C. A reaction temperature lower than −5° C. slows down too much the rate of alkoxysilane hydrolysis, leading to poor reaction efficiency. Alternatively, a reaction temperature exceeding 50° C. tends to reduce the dispersion stability of the powdery silica composite particles. Moreover, the alkoxysilane in the mixture of the reactant solution with the acid or alkali is hydrolyzed for a reaction time selected appropriately without particular limitations, preferably 1 to 72 hours, particularly preferably 1 to 24 hours.

Silica composite particles are produced by the surface treatment step to obtain a reaction solution containing silica composite particles. The silica composite particles in the reaction solution obtained by the surface treatment step are obtained using the core silica particles of 5 to 200 nm in average particle size as a raw material and are highly dispersible. Therefore, the silica composite particles are dispersed finely and uniformly in the reaction solution obtained by the surface treatment step.

A feature of the silica composite particle-containing reaction solution obtained by the surface treatment step is that the reaction solution is visually observed to have no solid matter and visually observed to have no precipitates after being centrifuged at an acceleration of 800 G for 30 minutes. A reaction solution previously disclosed in Japanese Patent Laid-Open No. 2007-270124 is a suspension, which is visually observed to contain solid matter. Moreover, this reaction suspension forms precipitates of silica composite particles as solid matter after being centrifuged at 3000 rpm for 30 minutes in the same way. Accordingly, the silica composite particle-containing reaction solution obtained by the surface treatment step according to the present invention can be said to differ in property from the reaction solution (suspension) previously disclosed in Japanese Patent Laid-Open No. 2007-270124. The silica composite particles dispersed in these reaction solutions can also be said to differ in property from each other. In this context, the centrifugation is performed by placing the solution to be centrifuged into a centrifuge tube and treating it in a centrifuge. Precipitates, if any, are visually observed in the bottom of the centrifuge tube. Accordingly, the phrase "visually observed to have no precipitates after being centrifuged" refers to the absence of distinguishable precipitates visually observed in the bottom of the centrifuge tube after centrifugation.

Subsequently, the silica composite particles are collected from the reaction solution obtained by the surface treatment step to obtain the powdery silica composite particles of the present invention.

In the present invention, the silica composite particles are collected from the reaction solution by an evaporative solvent removal step of evaporatively removing the reaction solvent from the reaction solution obtained by the surface treatment step to obtain powdery silica composite particles. In the evaporative solvent removal step, the reaction solvent is evaporatively removed by heating the reaction solution under atmospheric pressure or reduced pressure to a temperature that permits evaporation of the reaction solvent. The solid matter thus collected is dried, if necessary.

Thus, the powdery silica composite particles of the present invention are obtained by the evaporative solvent removal step. In the present invention, the reaction solution obtained by the surface treatment step is directly subjected to the evaporative removal of the reaction solvent. Therefore, the powdery silica composite particles can be obtained almost quantitatively.

A feature of the powdery silica composite particles of the present invention is that they comprise the phosphonium salt ionic liquid at a higher content than that in the powdery silica composite particles previously disclosed in Japanese Patent Laid-Open No. 2007-270124. Specifically, the powdery silica composite particles previously disclosed in Japanese Patent Laid-Open No. 2007-270124 comprise a phosphonium salt ionic liquid at a content of at most 0.60% by weight in terms of the P atom. By contrast, the powdery silica composite particles of the present invention comprise the phosphonium salt ionic liquid at a content of preferably 1.0% by weight or higher, particularly preferably 1.0 to 4.0% by weight, in terms of the P atom. The content of the phosphonium salt ionic liquid in the powdery silica composite particles of the present invention can be determined by dissolving the silica composite particles in hydrogen fluoride and ICP-analyzing the resultant solution.

The powdery silica composite particles of the present invention have another preferable physical property. Specifically, the powdery silica composite particles are of 5 to 200 nm, preferably 5 to 60 nm, in average particle size. The average particle size within this range is preferable in terms of favorable dispersibility in various dispersion solvents or resin materials.

The phosphonium salt ionic liquid represented by the general formula (1) has a site that is hydrolyzable in the surface treatment step. The present inventors have assumed that the phosphonium salt ionic liquid represented by the general formula (1) is present in the silica composite particle in two manners: the reaction residues of the ionic liquid form a chemical bond or intermolecular hydrogen bond with a polysiloxane compound, an alkoxysilane hydrolysate, thus the ionic liquid is present through the bond in the surface of the polysiloxane compound adhering to the core silica particle; and a portion of the molecular chains thereof is incorporated in the network of the polysiloxane compound thus the ionic liquid is present therein. The molecular chains of the reaction residues of the phosphonium salt ionic liquid represented by the general formula (1) bound with the surface of the polysiloxane compound as well as the portions of the reaction residues thereof unincorporated into the network of the polysiloxane compound extend from the surface of the silica composite particle. Therefore, the powdery silica composite particles of the present invention have a corona-like shape in which the reaction residues of the phosphonium salt ionic liquid represented by the general formula (1) extend radially from the surface of the core silica particle.

The powdery silica composite particles of the present invention, when added to various dispersion solvents or resin materials, hardly agglomerate by virtue of the action of the molecular chains of the reaction residues of the phosphonium salt ionic liquid represented by the general formula (1) extending from the surface of the core silica particle. Therefore, the powdery silica composite particles of the present invention are excellent in dispersibility in various dispersion solvents or resin materials. Accordingly, according to the powdery silica composite particles of the present invention, a dispersion comprising silica composite particles dispersed finely and uniformly is obtained. The powdery silica composite particles of the present invention also contain the phosphonium salt ionic liquid represented by the general formula (1) in the network of the polysiloxane compound. Therefore, according to the powdery silica composite particles of the present invention, a dispersion comprising an ionic liquid dispersed finely and uniformly is obtained.

It is assumed that the fluoroalkyl group-containing oligomer represented by the general formula (2) or (3) further added to the reactant solution is also present in the silica composite particle in two manners: the molecular chains of the fluoroalkyl group-containing oligomer can also form a chemical bond or intermolecular hydrogen bond with the polysiloxane compound, as in the phosphonium salt ionic liquid represented by the general formula (1), thus the oligomer is present through the bond in the surface of the polysiloxane compound; and a portion of the molecular chains thereof is incorporated in the network of the polysiloxane compound thus the oligomer is present therein. The molecular chains of the fluoroalkyl group-containing oligomer represented by the general formula (2) or (3) also assume a corona-like shape in which the molecular chains extend radially from the surface of the core silica particle. Therefore, the resultant powdery silica composite particles are probably further improved in dispersibility in various dispersion solvents or resin materials.

According to another embodiment of the present invention, silica composite particles may be prepared without the use of alkoxysilane. In this case, the silica composite particles are obtained by a surface treatment step of adding acid or alkali to a reactant solution comprising: core silica particles of 5 to 200 nm in average particle size; a phosphonium salt ionic liquid represented by the following general formula (1):

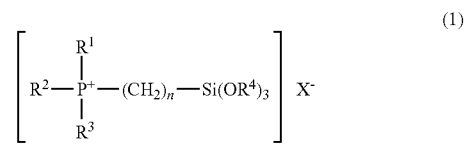

$$\left[ R^2\!-\!\overset{\overset{\displaystyle R^1}{|}}{\underset{\underset{\displaystyle R^3}{|}}{P^+}}\!-\!(CH_2)_n\!-\!Si(OR^4)_3 \right] X^- \quad (1)$$

wherein $R^1$, $R^2$, and $R^3$ respectively represent a linear or branched alkyl group having 1 to 5 carbon atoms, $R^4$ represents a linear or branched alkyl group having 1 to 5 carbon atoms, n represents an integer of 1 to 8, and X represents an anionic group; and a reaction solvent, thereby surface-treating the core silica particles.

In the silica composite particles of this embodiment, the phosphonium salt ionic liquid represented by the general formula (1) has a site that is hydrolyzable in the surface treatment step. It is assumed that the phosphonium salt ionic liquid represented by the general formula (1) is present in the surface of the core silica particle through the bond of its reaction residues with the core silica particle. The silica composite particles of this embodiment also have a corona-like shape in which the molecular chains of the reaction residues bound with the surface of the core silica particle extend radially from the surface of the core silica particle.

The silica composite particles of this embodiment have the same effects as those of the silica composite particles of the preceding embodiment. Accordingly, in the description below, the term "(powdery) silica composite particles" encompasses both the silica composite particles of the present embodiment and the silica composite particles of the preceding embodiment. The detailed description about the silica composite particles of the preceding embodiment is appropriately applied to the silica composite particles of the present embodiment, unless otherwise specified.

A silica composite particle dispersion of the present invention is a silica composite particle dispersion comprising the powdery silica composite particles of the present invention dispersed in a dispersion solvent.

The powdery silica composite particles of the present invention exhibit high dispersibility in various dispersion solvents. Therefore, a dispersion obtained by dispersing the powdery silica composite particles of the present invention in a dispersion solvent, i.e., the silica composite particle dispersion of the present invention, comprises the silica composite particles dispersed without agglomeration and is therefore visually observed to have no solid matter.

The dispersion solvent used in the silica composite particle dispersion of the present invention may be, without particular limitations, water or any organic solvent that is inactive for the powdery silica composite particles of the present invention and allows them to be dispersed uniformly. The organic solvent may be any polar or nonpolar organic solvent. Examples of the organic solvent used in the silica composite particle dispersion of the present invention include methanol, ethanol, isopropyl alcohol, dichloromethane, and tetrahydrofuran. The powdery silica composite particles of the present invention exhibit exceedingly high dispersibility particularly in water, methanol, and dichloromethane.

The reaction solution obtained by the surface treatment step used in the powdery silica composite particles of the present invention comprises the powdery silica composite particles of the present invention. Therefore, the reaction solution obtained by the surface treatment step used in the powdery silica composite particles of the present invention, or a diluted solution of the reaction solution with the dispersion solvent is the silica composite particle dispersion of the present invention.

Specifically, a reaction solution obtained by adding acid or alkali to the reactant solution comprising the core silica particles of 5 to 200 nm in average particle size, the alkoxysilane, the ionic liquid, and the reaction solvent such that the alkoxysilane is hydrolyzed, or a diluted solution thereof obtained by diluting this reaction solution with the dispersion solvent is also the silica composite particle dispersion of the present invention.

The concentration of the silica composite particles in the silica composite particle dispersion of the present invention is not particularly limited and may be adjusted appropriately in consideration of applications, how to use it, etc. In most cases, the concentration is 0.1 to 90% by weight.

The silica composite particle dispersion of the present invention can further be supplemented with an ionic liquid thus it contains the ionic liquid. The powdery silica composite particles of the present invention also function as a dispersant for dispersing the additional ionic liquid in the dispersion solvent. Therefore, in the silica composite particle dispersion of the present invention further supplemented with an ionic liquid, the additional ionic liquid is dispersed finely and uniformly. Specifically, the powdery silica composite particles of the present invention and the silica composite particle dispersion of the present invention allow the additional ionic liquid to be dispersed finely and uniformly in various dispersion solvents.

The additional ionic liquid used in the silica composite particle dispersion of the present invention may be any ionic liquid known in the art without particular limitations. Examples of the additional ionic liquid include imidazolium, quaternary ammonium, pyridinium, and phosphonium compounds. Alternatively, the additional ionic liquid may be the phosphonium salt ionic liquid represented by the general formula (1). The additional ionic liquid may be added in any amount without particular limitations within a range that allows it to be dispersed in the dispersion solvent for the silica composite particle dispersion of the present invention.

A resin composition of the present invention comprises the powdery silica composite particles of the present invention. In other words, the resin composition of the present invention comprises the powdery silica composite particles of the present invention dispersed in a resin material. The powdery silica composite particles of the present invention are finely grained and are highly dispersible in resin materials. Therefore, the resin composition of the present invention is a resin composition comprising the silica composite particles dispersed finely and uniformly. Moreover, the powdery silica composite particles of the present invention comprise the phosphonium salt ionic liquid represented by the general formula (1). Therefore, the resin composition of the present invention is a resin composition comprising the ionic liquid dispersed finely and uniformly.

In the resin composition of the present invention, the resin material for dispersing therein the powdery silica composite particles is not particularly limited. Examples thereof for a rubber composition include natural rubber, styrene-butadiene rubber (SBR), acrylonitrile-butadiene rubber (NBR), butyl rubber (IIR), polybutadiene rubber (BR), ethylene-propylene rubber (EPM), chloroprene rubber (CR), polyisobutylene rubber, acrylic rubber, hydrogenated acrylonitrile-butadiene rubber, polysulfide rubber, urethane rubber, chlorosulfonated rubber, silicone rubber, and modifications thereof. They may be used as a rubber blend of two or more of them. Alternatively, examples of resins serving as a matrix for obtaining other molded resin products such as sheets, films, containers, and fibers include: thermoplastic resins such as polyvinyl chloride, polyethylene, polypropylene, polyamide, polycarbonate, polyester, polystyrene, ABS, AS, and thermoplastic acrylic resins; thermosetting resins such as epoxy, unsaturated polyester, diallyl phthalate, phenol, and urea resins; other resins such as alkyd, melamine, guanidine, vinyl, polyamine, acrylic, polybutadiene, urethane, silicon, and fluorine-containing resins; and modifications thereof.

The content of the powdery silica composite particles of the present invention in the resin composition of the present invention is usually 0.01 to 50% by weight, preferably 0.5 to 40% by weight.

The resin composition of the present invention can also contain other components such as inorganic fillers (e.g., white carbon, carbon black, zeolite, calcium carbonate, clay, barium sulfate, and magnesium carbonate), organic fillers (e.g., high-styrene resin, lignin, and phenol resin), antimicrobial agents, UV absorbers, antioxidants, extender pigments, dispersion aids, vulcanizing agents, vulcanization accelerators, vulcanization aids, softeners, age resistors, and plasticizers.

The resin composition of the present invention is produced, for example, by: mixing the powdery silica composite particles of the present invention with the desired resin material; and melt-blending the mixture such that the powdery silica composite particles of the present invention are dispersed in the resin material. Alternatively, the resin composition of the present invention is produced, for example, by: adding the powdery silica composite particles of the present invention or the silica composite particle dispersion of the present invention to a resin solution containing the desired resin material dissolved in a solvent; mixing the resultant solution; and then molding the mixture into a desired shape (e.g., a film), followed by drying and evaporative solvent removal.

The resin composition of the present invention can further contain an ionic liquid, and this resin composition is obtained by adding the powdery silica composite particles of the present invention together with the ionic liquid to the resin material such that they are dispersed in the resin material. The powdery silica composite particles of the present invention allow the additional ionic liquid to be dispersed uniformly in the resin material. Therefore, in the resin composition of the present invention containing the additional ionic liquid, the additional ionic liquid is dispersed uniformly. Specifically, the resin composition of the present invention contains the additional ionic liquid dispersed finely.

The additional ionic liquid used in the resin composition of the present invention may be any ionic liquid known in the art without particular limitations. Examples of the additional ionic liquid include imidazolium, quaternary ammonium, pyridinium, and phosphonium compounds. Alternatively, the additional ionic liquid may be the phosphonium salt ionic liquid represented by the general formula (1). The additional ionic liquid may be added in any amount without particular limitations within a range that allows it to be dispersed in the resin composition of the present invention.

A process for producing powdery silica composite particles according to the present invention comprises the surface treatment step used in the powdery silica composite particles of the present invention. Alternatively, the process for producing powdery silica composite particles according to the present invention comprises the surface treatment and evaporative solvent removal steps used in the powdery silica composite particles of the present invention.

Ionic liquids are difficult to directly disperse uniformly in the whole of various solvents or resin materials. Therefore, ionic liquids dispersed directly therein tend to be lacking in uniform dispersion. Moreover, ionic liquids are dispersed in droplet state in various dispersion solvents or resin materials. The particle size of the droplet is difficult to decrease. Therefore, a volume per ionic liquid droplet is large. When dispersion solvents or resin materials comprising an ionic liquid dispersed directly therein are locally observed in small units, the abundance of the ionic liquid varies largely from unit to unit. Specifically, an ionic liquid dispersed directly in various dispersion solvents or resin materials is both overall and locally observed to be lacking in uniform dispersion.

On the other hand, the powdery silica composite particles of the present invention are dispersed in various dispersion solvents or resin materials such that the phosphonium salt ionic liquid represented by the general formula (1) is dispersed therein using the solid core silica particles as carriers. In this case, the ionic liquid is more easily dispersed than ionic liquids dispersed directly. Therefore, the powdery silica composite particles of the present invention offer the high dispersibility of the ionic liquid in the whole of various dispersion solvents or resin materials. Moreover, the powdery silica composite particles of the present invention are exceedingly finely grained as fine as 5 to 200 nm, preferably 5 to 60 nm. Therefore, the ionic liquid, when observed in small units, is dispersed more finely and uniformly than ionic liquids dispersed directly. Specifically, the powdery silica composite particles of the present invention allow the ionic liquid to be both overall and locally observed to be less lacking in uniform dispersion and to be dispersed finely and uniformly.

The powdery silica composite particles of the present invention allow the additional ionic liquid to be dispersed finely and uniformly in dispersion solvents or resin materials. Therefore, the present invention can provide dispersions comprising various ionic liquids dispersed finely and uniformly in dispersion solvents and resin compositions comprising various ionic liquids dispersed finely and uniformly in resin materials.

A phosphonium salt has antistatic and antimicrobial properties. Therefore, the powdery silica composite particles of the present invention can be prepared into functional materials having various functions such as antistatic and antimicrobial properties, heat resistance, and catalytic activity.

EXAMPLES

Hereinafter, the present invention will be described in detail with reference to Examples. However, the present invention is not intended to be limited to them.

Synthesis Example 1

A 1-L three-neck flask was charged with 69.3 g (0.41 mol) of diacetone acrylamide and 500 ml of AK-225 and further charged with 334 g of a 10% AK-225 solution of perfluoro-2-methyl-3-oxahexanoyl peroxide ($[C_3F_7$—O—$CF(CF_3)$—CO—$O]_2$) (0.05 mol of perfluoro-2-methyl-3-oxahexanoyl peroxide) at room temperature. Then, the mixture was heated to 45° C. with stirring and aged for 5 hours. The stirring was stopped, and the mixture was left standing overnight. The mixture thus left standing was concentrated, and the residue was washed with AK-225, filtered, and vacuum-dried at 50° C. to obtain a fluoroalkyl group-containing oligomer encompassed in the general formula (2) (abbreviated to RF-DOBAA). The results are shown in Table 1. In this context, AK-225 is an incombustible fluorine solvent manufactured by Asahi Glass Co., Ltd. Its structural formula is represented by $CF_3CF_2CHCl_2/CClF_2CF_2CHClF$.

TABLE 1

| General formula (2) | $R^5$ | —$CF(CF_3)OC_3F_7$ |
|---|---|---|
|  | $R^6$ | —$CF(CF_3)OC_3F_7$ |
|  | Z | —$NHC(CH_3)_2CH_2COCH_3$ |
| Molecular weight |  | 3710 |

*In Table 1, the molecular weight is a number-average molecular weight determined by gel permeation chromatography (GPC against polystyrene standards).

Synthesis Example 2

Trimethoxyvinylsilane (2.3 g) was added to 150 g of an AK-225 solution containing perfluoro-2-methyl-3-oxahexanoyl peroxide (5.1 g), and the mixture was reacted at 45° C. for 5 hours in a nitrogen atmosphere. After the completion of reaction, the reaction solvent was removed, and the residue was distilled to obtain 3.0 g of a fluoroalkyl group-containing oligomer encompassed in the general formula (3) (abbreviated to an RF-VM oligomer) of interest. The results are shown in Table 2. In this context, AK-225 is an incombustible fluorine solvent manufactured by Asahi Glass Co., Ltd. Its structural formula is represented by $CF_3CF_2CHCl_2/CClF_2CF_2CHClF$.

TABLE 2

| General formula (3) | $R^5$ | $CF(CF_3)OC_3F_7$ |
|---|---|---|
|  | $R^6$ | $CF(CF_3)OC_3F_7$ |
|  | $R^7$ | $CH_3$ |
|  | $R^8$ | $CH_3$ |
|  | $R^9$ | $CH_3$ |
| Molecular weight |  | 950 |

(Phosphonium Salt Ionic Liquid)

Phosphonium salt ionic liquids used are shown in Table 3.

TABLE 3

|  | General formula (1) | | | |
| --- | --- | --- | --- | --- |
|  | $R^1$~$R^3$ | $R^4$ | n | X |
| Phosphonium salt sample A | n-$C_4H_9$ | $CH_3$ | 3 | Cl |
| Phosphonium salt sample B | n-$C_6H_{13}$ | $CH_3$ | 3 | Cl |

*In Table 3, the phosphonium salt samples used are manufactured by Nippon Chemical Industrial Co., Ltd.

(Core Silica Particles)

A source of core silica particles used was a silica sol (a 30 wt % methanol solution, manufactured by Nissan Chemical Industries, Ltd., average particle size: 11 nm).

Examples 1 to 4

A 50-ml sample vial was charged with 20 ml of methanol and subsequently with the phosphonium salt sample A added in an amount shown in Table 4, 3.33 g of the silica sol ($SiO_2$ content: 1.0 g), and 0.5 ml of tetraethoxysilane (manufactured by Tokyo Chemical Industry Co., Ltd.), and the mixture was mixed by stirring. Subsequently, 25% by weight of ammonia water was added thereto in an amount shown in Table 4 at room temperature (25° C.) with sufficient stirring mixing. Next, the mixture was reacted by stirring at room temperature (25° C.) for 5 hours to obtain a clear reaction solution. After the completion of reaction, the reaction solution was distilled at 50° C. under reduced pressure for solvent removal to obtain solid matter as a residue.

The solid matter was IR-analyzed. As a result, peaks attributed to the phosphonium salt were observed around 1465 $cm^{-1}$ and 1412 $cm^{-1}$ and further around 2900 $cm^{-1}$.

The reaction solution was visually observed to have no precipitates even after being centrifuged at an acceleration of 800 G for 30 minutes. The state of the reaction solution and the reaction yields are shown in Table 5.

Examples 5 to 8

A 50-ml sample vial was charged with 20 ml of methanol and subsequently with the phosphonium salt sample A added in an amount shown in Table 4, the RF-DOBAA oligomer (prepared in Synthesis Example 1) added in an amount shown in Table 4, 3.33 g of the silica sol ($SiO_2$ content: 1.0 g), and 0.5 ml of tetraethoxysilane (manufactured by Tokyo Chemical Industry Co., Ltd.), and the mixture was mixed by stirring. Subsequently, 25% by weight of ammonia water was added thereto in an amount shown in Table 4 at room temperature (25° C.) with sufficient stirring mixing. Next, the mixture was reacted by stirring at room temperature (25° C.) for 5 hours to obtain a clear reaction solution. After the completion of reaction, the reaction solution was distilled at 50° C. under reduced pressure for solvent removal to obtain solid matter as a residue.

The solid matter was IR-analyzed. As a result, peaks attributed to the phosphonium salt were observed around 1465 $cm^{-1}$ and 1412 $cm^{-1}$ and further around 2900 $cm^{-1}$. Moreover, peaks attributed to the amide group in the RF-DOBAA oligomer were observed around 1715 $cm^{-1}$ and 1654 $cm^{-1}$.

The reaction solution was visually observed to have no precipitates even after being centrifuged at an acceleration of 800 G for 30 minutes. The state of the reaction solution and the reaction yields are shown in Table 5.

Examples 9 to 11

A 50-ml sample vial was charged with 20 ml of methanol and subsequently with the phosphonium salt sample A added in an amount shown in Table 4, the RF-VM oligomer (prepared in Synthesis Example 2) added in an amount shown in Table 4, 3.33 g of the silica sol ($SiO_2$ content: 1.0 g), and 0.5 ml of tetraethoxysilane (manufactured by Tokyo Chemical Industry Co., Ltd.), and the mixture was mixed by stirring. Subsequently, 5.0 ml of 25% by weight of ammonia water was added thereto at room temperature (25° C.) with sufficient stirring mixing. Next, the mixture was reacted by stirring at room temperature (25° C.) for 5 hours to obtain a clear reaction solution. After the completion of reaction, the reaction solution was distilled at 50° C. under reduced pressure for solvent removal to obtain solid matter as a residue.

The solid matter was IR-analyzed. As a result, peaks attributed to the phosphonium salt were observed around 1465 $cm^{-1}$ and 1412 $cm^{-1}$ and further around 2900 $cm^{-1}$.

The reaction solution was visually observed to have no precipitates even after being centrifuged at an acceleration of 800 G for 30 minutes. The state of the reaction solution and the reaction yields are shown in Table 5.

Comparative Example 1

A 50-ml sample vial was charged with 20 ml of methanol and subsequently with 0.5 ml of the phosphonium salt sample B, 0.5 g of the RF-DOBAA oligomer, 3.33 g of the silica sol, and 2.3 ml of tetraethoxysilane, and the mixture was mixed by stirring. Subsequently, 0.5 ml of 25% by weight of ammonia water was added thereto with sufficient stirring mixing, and the mixture was stirred overnight to obtain a reaction suspension.

After the completion of reaction, the reaction solution was distilled at 50° C. under reduced pressure for solvent removal to obtain solid matter as a residue. Subsequently, methanol was added to the obtained solid matter, and the mixture was stirred overnight such that the solid matter was dispersed therein, followed by centrifugation. The procedure in which the obtained solid matter was added to methanol and dispersed overnight, followed by centrifugation was repeated twice for purification. The solid matter thus purified was vacuum-dried in a vacuum desiccator to obtain powdery silica composite particles.

The solid matter was IR-analyzed. As a result, peaks attributed to the phosphonium salt were observed around 1465 $cm^{-1}$ and 1412 $cm^{-1}$ and further around 2900 $cm^{-1}$. Moreover, peaks attributed to the amide group in the RF-DOBAA oligomer were observed around 1715 $cm^{-1}$ and 1654 $cm^{-1}$.

The reaction solution was visually observed to have precipitates after being centrifuged at an acceleration of 800 G for 30 minutes. The state of the reaction solution and the reaction yields are shown in Table 5.

TABLE 4

| | Phosphonium salt sample | | Amount of RF-DOBBA or RF-VM added (g) | Amount of 30 wt % silica sol added (g) | Amount of Si(OEt)4 added (mmol) | Amount of 25 wt % ammonia water added (ml) |
|---|---|---|---|---|---|---|
| | Type | Amount of added (ml) | | | | |
| Example 1 | A | 0.2 | — | 3.33 | 2.3 | 1 |
| Example 2 | A | 0.4 | — | 3.33 | 2.3 | 2 |
| Example 3 | A | 0.6 | — | 3.33 | 2.3 | 3 |
| Example 4 | A | 1.0 | — | 3.33 | 2.3 | 5 |
| Example 5 | A | 0.2 | 0.15 | 3.33 | 2.3 | 1 |
| Example 6 | A | 0.4 | 0.17 | 3.33 | 2.3 | 2 |
| Example 7 | A | 0.6 | 0.19 | 3.33 | 2.3 | 3 |
| Example 8 | A | 1.0 | 0.24 | 3.33 | 2.3 | 5 |
| Example 9 | A | 0.9 | 0.05 | 3.33 | 2.3 | 5 |
| Example 10 | A | 0.9 | 0.10 | 3.33 | 2.3 | 5 |
| Example 11 | A | 0.9 | 0.15 | 3.33 | 2.3 | 5 |
| Comparative Example 1 | B | 0.5 | 0.50 | 3.33 | 10.58 | 0.5 |

TABLE 5

| | Physical property of reaction solution | | Yields (%) |
|---|---|---|---|
| | State after completion of reaction | After centrifugation | |
| Example 1 | Visually observed to have no solid matter | Visually observed to have no precipitates | 100 |
| Example 2 | Visually observed to have no solid matter | Visually observed to have no precipitates | 99 |
| Example 3 | Visually observed to have no solid matter | Visually observed to have no precipitates | 98 |
| Example 4 | Visually observed to have no solid matter | Visually observed to have no precipitates | 100 |
| Example 5 | Visually observed to have no solid matter | Visually observed to have no precipitates | 100 |
| Example 6 | Visually observed to have no solid matter | Visually observed to have no precipitates | 99 |
| Example 7 | Visually observed to have no solid matter | Visually observed to have no precipitates | 98 |
| Example 8 | Visually observed to have no solid matter | Visually observed to have no precipitates | 100 |
| Example 9 | Visually observed to have no solid matter | Visually observed to have no precipitates | 21 |
| Example 10 | Visually observed to have no solid matter | Visually observed to have no precipitates | 42 |
| Example 11 | Visually observed to have no solid matter | Visually observed to have no precipitates | 9 |
| Comparative Example 1 | Suspension, Visually observed to have solid matter | Visually observed to have precipitates | 38.1 |

(Physical Property Evaluation on Silica Composite Particles)

The powdery silica composite particles obtained in Examples 1 to 11 were TGA-measured. From the TGA curves, P (phosphorus) atom and fluorine atom contents were determined. The results are shown in Table 6. The TGA curves are shown in FIGS. 1 to 6. FIGS. 1 to 6 also show TGA measurement results of an untreated silica sol as Comparative Example 2 to be measured. FIGS. 1 to 4 further show TGA measurement results of RF-DOBAA to be measured alone. However, the P atom and fluorine atom contents based on TGA were not calculated for Examples 9 to 11. Aside from these TGA measurements, the P atom content in the powdery silica composite particles was measured using an ICP emission spectrometer. The fluorine atom content therein was measured using an elemental analyzer. The results are also shown in Table 6.

In this context, the powdery silica composite particles of the present invention obtained in each Example were obtained by evaporatively removing the solvent from the reaction solution and collecting the residue. Therefore, theoretical P and fluorine atomic weights directly serve as the total P and fluorine atomic weights contained in the silica composite particles obtained in Examples.

The average particle size of the powdery silica composite particles was measured using a light scattering photometer (DLS-6000HL manufactured by Otsuka Electronics Co., Ltd.) by redispersing the particles in methanol. The results are shown in Table 6.

TABLE 6

| | P atom content (wt %) | | Fluorine atom content (wt %) | | Average particle size (nm) |
|---|---|---|---|---|---|
| | ICP value (theoretical value) | TGA value | Value determined using elemental analyzer (theoretical value) | TGA value | |
| Example 1 | 1.29 | 0.25 | — | — | 54.2 ± 9.6 |
| Example 2 | 2.21 | 0.77 | — | — | 44.3 ± 10.9 |
| Example 3 | 2.91 | 1.09 | — | — | 35.1 ± 8.7 |
| Example 4 | 3.87 | 1.65 | — | — | 40.1 ± 9.6 |
| Example 5 | 1.16 | 0.26 | 0.60 | 0.35 | 30.7 ± 4.4 |
| Example 6 | 1.99 | 0.79 | 0.58 | 0.45 | 30.0 ± 4.7 |
| Example 7 | 2.61 | 1.10 | 0.57 | 0.39 | 29.3 ± 4.2 |
| Example 8 | 3.48 | 1.66 | 0.57 | 0.44 | 35.2 ± 7.6 |
| Example 9 | 3.76 | — | 0.79 | — | 52.0 ± 9.9 |
| Example 10 | 3.69 | — | 1.54 | — | 133.5 ± 3.3 |
| Example 11 | 3.61 | — | 2.27 | — | 25.7 ± 3.8 |
| Comparative Example 1 | 0.34 | | 1.29 | | 82.9 ± 8.2 |

As shown in Table 6, in the silica composite particles of Examples 5 and 6 containing the fluoroalkyl group-containing oligomer, the fluorine atom contents calculated from the TGA curves are consistent with their theoretical values, whereas the phosphonium salt ionic liquid-derived P atom contents calculated from the TGA curves largely differ from their theoretical values. This is probably because in these silica composite particles, the phosphonium salt ionic liquid is encapsulated more efficiently in a silica matrix composed of a polysiloxane compound, an alkoxysilane hydrolysate, than the fluoroalkyl group-containing oligomer. Referring to Examples 4 and 8, up to 27% by weight (corresponding to 2.08% by weight in terms of the P atom) of the phosphonium salt ionic liquid can be encapsulated in the silica matrix. The phosphonium salt ionic liquid other than this encapsulated one exhibits a distinct TGA weight loss corresponding to 20% by weight (1.54% by weight in terms of the P atom). Therefore, approximately 20% by weight of the phosphonium salt ionic liquid can be released easily to the outside of the matrix system. On the other hand, it is suggested that the phosphonium salt ionic liquid corresponding to 27% by weight is firmly encapsulated in the silica matrix and does not exhibit a TGA loss. Absorption around 2900 cm$^{-1}$ attributed to the phosphonium salt ionic liquid is observed from FT-IR analysis, suggesting the presence of the phosphonium salt ionic liquid as a free form unadsorbed in the silica matrix.

In the silica composite particles of Examples 9 to 11 containing the fluoroalkyl group-containing oligomer, the contents of the RF-VM oligomer and the phosphonium salt ionic liquid were determined by TGA measurement to be 10 to 60% in total.

In the silica composite particles containing the fluoroalkyl group-containing oligomer, absorptions attributed to the fluoroalkyl group-containing oligomer and the phosphonium salt ionic liquid are observed around 1700 cm$^{-1}$ and around 2900 cm$^{-1}$, respectively, in the FT-IR spectra. The TGA weight loss of the fluoroalkyl group close to the theoretical amount is seen, indicating that the silica matrix interacts efficiently with the phosphonium salt ionic liquid, rather than the fluoroalkyl group-containing oligomer, and incorporates therein the phosphonium salt ionic liquid lacking in TGA weight loss.

(Dispersibility Evaluation)

(1) The powdery silica composite particles obtained in Examples 1 to 8 and Comparative Example 1 were tested for their dispersibility in various dispersion solvents. The results are shown in Table 7. In this context, the evaluation was conducted by: adding 0.01 g of the powdery silica composite particles to the 5 ml of each dispersion solvent; and visually observing the dispersion state. Moreover, Comparative Example 2 (untreated silica sol) was subjected to a dispersibility test in the same way. The results are also shown in Table 7.

The symbols in Table denote the followings:
⊙: visually observed to have no solid matter by virtue of favorable dispersibility
○: obtained as a whitish solution by virtue of Favorable dispersibility
Δ: dispersed
x: not dispersed

TABLE 7

| | Type of solvent[1] | | | | |
|---|---|---|---|---|---|
| | H$_2$O | MeOH | AK-225 | THF | Dichloroethane |
| Example 1 | ⊙ | ⊙ | Δ | ○ | ⊙ |
| Example 2 | ⊙ | ⊙ | Δ | ○ | ⊙ |
| Example 3 | ⊙ | ⊙ | Δ | ○ | ⊙ |
| Example 4 | ⊙ | ⊙ | Δ | ○ | ⊙ |
| Example 5 | ⊙ | ⊙ | Δ | ○ | ⊙ |
| Example 6 | ⊙ | ⊙ | Δ | ○ | ⊙ |
| Example 7 | ⊙ | ⊙ | Δ | ○ | ⊙ |
| Example 8 | ⊙ | ⊙ | Δ | ○ | ⊙ |
| Comparative Example 1 | ○ | ○ | Δ | ○ | ○ |
| Comparative Example 2 | Δ | Δ | X | X | X |

[1]AK-225: mixed solution of CF$_3$CF$_2$CHCl$_2$ and CClF$_2$CF$_2$CHClF at a ratio of 1:1 by weight, THF: tetrahydrofuran, Dichloroethane: 1,2-dichloroethane (CH$_2$ClCH$_2$Cl)

The results of Table 7 demonstrate that the untreated silica nanoparticles (Comparative Example 2) exhibit no dispersibility in various dispersion solvents, whereas the powdery silica composite particles of the present invention exhibit exceedingly high dispersibility in various dispersion solvents. Moreover, the powdery silica composite particles of the present invention exhibited significant dispersion stability particularly in methanol, water, and 1,2-dichloroethane and formed a dispersion visually observed to have no solid matter.

(2) The relationship of the refractive indices of various dispersion solvents with the turbidities of these series of silica composite particle dispersions (Examples 4 and 8) was studied using an UV-vis spectra. The results are shown in FIG. 7.

Figure 7:
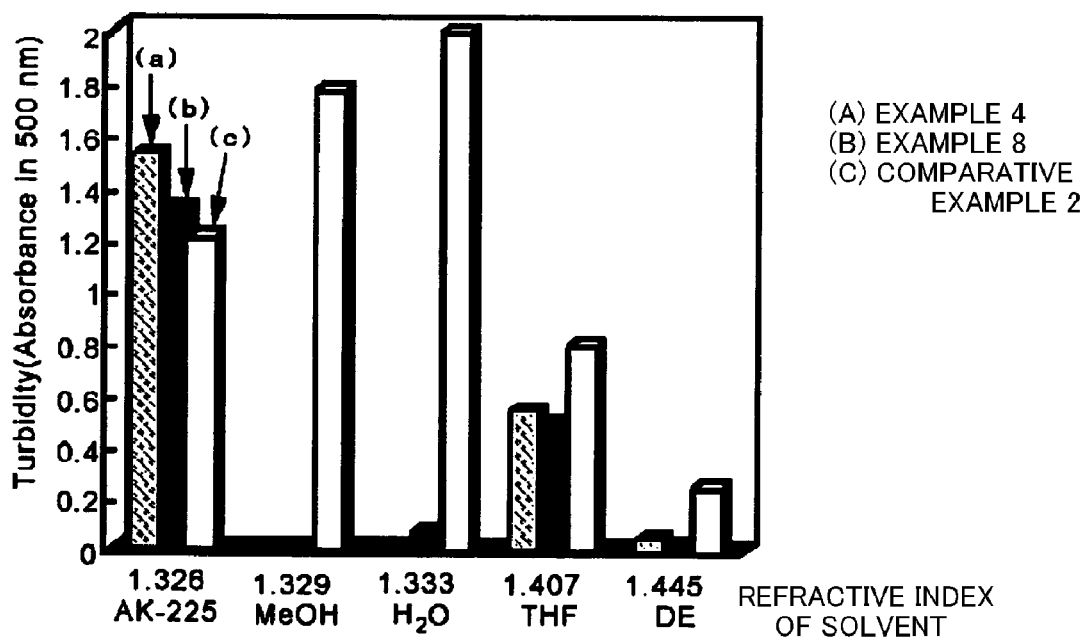
FIG. 7 is a diagram showing the relationship of a dispersion containing each of silica composite particles obtained in Examples 4 and 8 and untreated silica particles (Comparative Example 2) with turbidity.

As shown in FIG. 7, these series of silica composite particles had the minimum value of turbidity in methanol and water and also tended to have low turbidity in 1,2-dichloromethane. This is probably because the silica composite particles have high organic nature and further have a refractive index similar to that of the dispersion solvent. From this relationship shown in FIG. 7, it is deduced that the silica composite particles have a refractive index around 1.33.

Resin Composition

Examples 12 to 14

In 8 ml of water, polyvinyl alcohol was dissolved, and a dispersion comprising the powdery silica composite particles of Example 2, 6, or 8 dispersed in methanol was added to the solution to prepare a resin solution containing 0.3 parts by weight of the silica composite particles with respect to 0.7 parts by weight of polyvinyl alcohol. Subsequently, each resin solution was added to a Petri dish, naturally dried at room temperature (25° C.) for 2 days, and further vacuum-dried overnight to prepare a cast film. The resin make-ups of the prepared resin solutions are shown in Table 8. Moreover, the obtained polyvinyl alcohol films were measured at room temperature (25° C.) for contact angles of dodecane on the surface and the reverse side and for conductivity. The results are shown in Table 9. The contact angles were measured using Drop Master 300 manufactured by Kyowa Interface Science Co., Ltd. The conductivity was measured using 4339B manufactured by Agilent Technology.

Examples 15 to 18

In 8 ml of water, 0.4 g of polyvinyl alcohol (PVA) was dissolved, and a dispersion comprising the powdery silica composite particles of Example 2, 4, 6, or 8 dispersed in methanol was added to the solution. To this resin solution, 0.3 g of the phosphonium salt sample A was further added to prepare a resin solution containing 0.6 parts by weight in total of the silica composite particles (0.3 parts by weight) and the phosphonium salt sample A (0.3 parts by weight) with respect to 0.4 parts by weight of polyvinyl alcohol. Subsequently, each resin solution was added to a Petri dish, naturally dried at room temperature (25° C.) for 2 days, and further vacuum-dried overnight to prepare a cast film. The resin make-ups of the prepared resin solutions are shown in Table 8. Moreover, the obtained polyvinyl alcohol films were measured at room temperature (25° C.) for contact angles of dodecane on the surface and the reverse side and for conductivity. The results are shown in Table 9.

TABLE 8

| | Resin make-up | | | | |
|---|---|---|---|---|---|
| | Silica composite particles | | Phosphonium salt added later | | Film thickness |
| | Type | Amount of added (g) | Type | Amount of added (g) | PVA (g) | ness (μm) |
| Example 12 | Example 2 | 0.3 | — | — | 0.7 | 144 |
| Example 13 | Example 6 | 0.3 | — | — | 0.7 | 156 |
| Example 14 | Example 8 | 0.3 | — | — | 0.7 | 169 |
| Example 15 | Example 2 | 0.3 | A | 0.3 | 0.4 | 363 |
| Example 16 | Example 4 | 0.3 | A | 0.3 | 0.4 | 412 |
| Example 17 | Example 6 | 0.3 | A | 0.3 | 0.4 | 515 |
| Example 18 | Example 8 | 0.3 | A | 0.3 | 0.4 | 407 |

TABLE 9

| | Contact angle (°) | | Conductivity (S/m) |
|---|---|---|---|
| | Surface | Reverse side | |
| Example 12 | 0 | 0 | $8.0 \times 10^{-12}$ |
| Example 13 | 28.7 | 0 | $9.2 \times 10^{-12}$ |
| Example 14 | 32.2 | 0 | $1.8 \times 10^{-12}$ |
| Example 15 | 0 | 0 | $8.7 \times 10^{-11}$ |
| Example 16 | 0 | 0 | $8.9 \times 10^{-11}$ |
| Example 17 | 27.1 | 0 | $1.6 \times 10^{-10}$ |
| Example 18 | 28.2 | 0 | $1.2 \times 10^{-10}$ |

The results of Examples 12, 13, and 14 show that the silica composite particles containing the fluoroalkyl group-containing oligomer (Examples 13 and 14) exhibit a larger contact angle of dodecane on the surface than that on the reverse side. The results of Examples 15 to 18 comprising the phosphonium salt ionic liquid added later show that the silica composite particles containing the fluoroalkyl group-containing oligomer (Examples 17 and 18) also exhibit a larger contact angle of dodecane on the surface than that on the reverse side. Accordingly, it is demonstrated that the silica composite particles are efficiently dispersed in the surface of the polyvinyl alcohol film. Moreover, the polyvinyl alcohol film prepared in each Example was placed on white paper with written words, and the transparency of the film was observed. As a result, the film containing the silica composite particles of the present invention maintained higher transparency than that of an untreated film free from the silica composite particles of the present invention, demonstrating that the powdery silica composite particles are dispersed uniformly in the resin.

The polyvinyl alcohol films of Examples 12 to 14 had no significant distinguishable difference in conductivity from a polyvinyl alcohol film free from the silica composite particles (conductivity: $2.8 \times 10^{-12}$ S/m), regardless of the presence or absence of addition of the fluoroalkyl group-containing oligomer. By contrast, the results of Examples 15 to 18 comprising the phosphonium salt ionic liquid added later show that high conductivity can be imparted to the polyvinyl alcohol films. Particularly, the results of Examples 17 and 18 show that the use of the silica composite particles containing the fluoroalkyl group-containing oligomer significantly improves conductivity. This result demonstrates that the phosphonium salt ionic liquid added later is also dispersed finely and uniformly in the polyvinyl alcohol films.

Example 19

Solid matter (powdery silica composite particles) was obtained in the same way as in Example 10 except that tetraethoxysilane was not used.

The solid matter was IR-analyzed. As a result, peaks attributed to the phosphonium salt were observed around 1465 cm$^{-1}$ and 1412 cm$^{-1}$ and further around 2900 cm$^{-1}$.

The reaction solution was visually observed to have no precipitates even after being centrifuged at an acceleration of 800 G for 30 minutes.

The average particle size of the obtained powdery silica composite particles was measured using a light scattering photometer (DLS-6000HL manufactured by Otsuka Electronics Co., Ltd.) by redispersing the particles in methanol.

The measurement results of the state of the reaction solution, the reaction yields, and the average particle size are shown in Table 10.

Figure 8:
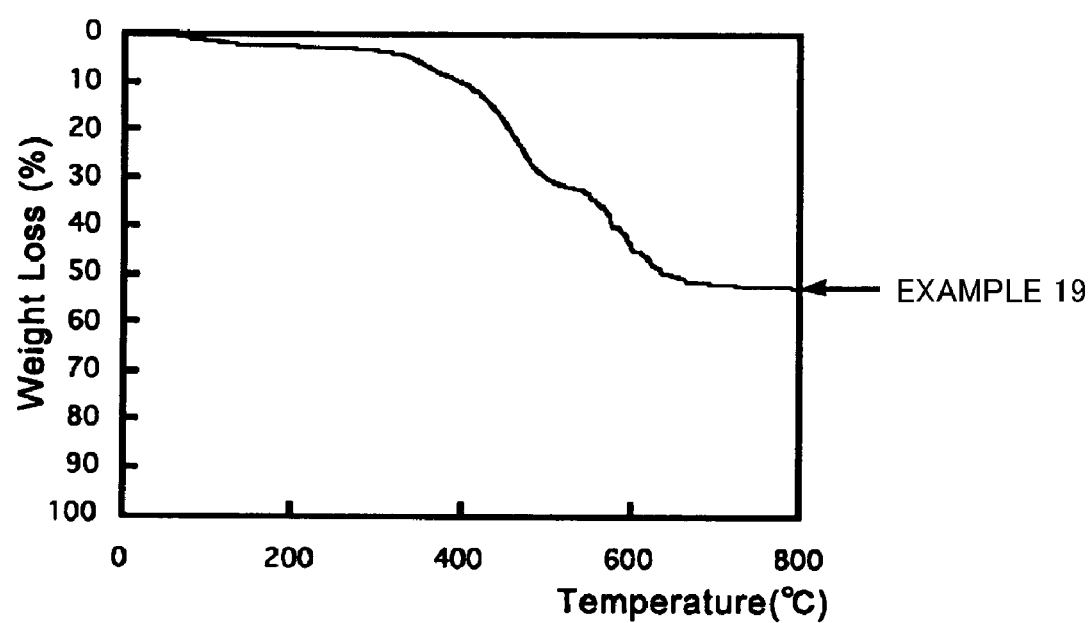
FIG. 8 shows thermogravimetric analysis results of silica composite particles obtained in Example 19.

Moreover, TGA measurement results of the obtained powdery silica composite particles are shown in FIG. 8. Aside from the TGA measurement values, the P atom content in the powdery silica composite particles was measured using an ICP emission spectrometer. The fluorine atom content therein was measured using an elemental analyzer. The results are also shown in Table 10.

TABLE 10

| | Physical property of reaction solution | | Yields (%) | Average particle size (nm) | ICP value of P atom content (wt %) | Value of fluorine atom content determined using elemental analyzer (wt %) |
|---|---|---|---|---|---|---|
| | State after completion of reaction | After centrifugation | | | | |
| Example 19 | Visually observed to have no solid matter | Visually observed to have no precipitates | 30 | 24.5 ± 5.0 | 3.91 | 1.64 |

According to the powdery silica composite particles, the silica composite particle dispersion, and the resin composition of the present invention, a dispersion and a resin composition comprising an ionic liquid dispersed finely and uniformly can be produced at high yields by an industrially advantageous process.

What is claimed is:

1. Powdery silica composite particles comprising silica composite particles obtained by a surface treatment step of adding acid or alkali to a reactant solution comprising:
   core silica particles of 5 to 200 nm in average particle size;
   alkoxysilane;
   a phosphonium salt ionic liquid represented by the following general formula (I):

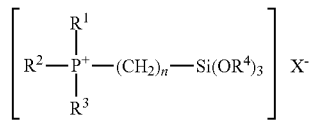

wherein $R^1$, $R^2$, and $R^3$ respectively represent a linear or branched alkyl group having 1 to 5 carbon atoms, $R^4$ represents a linear or branched alkyl group having 1 to 5 carbon atoms, n represents an integer of 1 to 8, and X represents an anionic group; and
   a reaction solvent such that the alkoxysilane is hydrolyzed, thereby surface-treating the core silica particles;
   wherein the silica composite particles comprise the phosphonium salt ionic liquid represented by the general formula (1) at a content of 1% by weight or higher in terms of the P atom.

2. The powdery silica composite particles according to claim 1, wherein the reaction solvent is removed by evaporation of the reaction solution.

3. The powdery silica composite particles according to claim 2, wherein the reaction solution is observed to have no precipitates after being centrifuged at an acceleration of 800 G for 30 minutes.

4. The powdery silica composite particles according to claim 2, wherein the reaction solvent is methanol.

5. The powdery silica composite particles according to claim 1, wherein the phosphonium salt ionic liquid is represented by general formula (1) wherein R1, R2, and R3 are respectively an n-butyl group, R4 is a methyl group, and n is 3.

6. The powdery silica composite particles according to claim 1, wherein the reactant solution further comprises a fluoroalkyl group-containing oligomer represented by general formula (2) or (3):

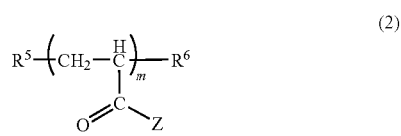

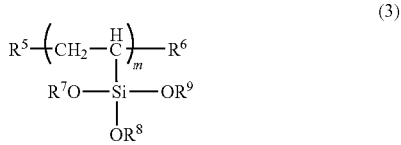

wherein $R^5$ and $R^6$ which may be the same or different represent a $—(CF_2)_p—Y$ group or $—CF(CF_3)—[OCF_2CF(CF_3)]_q—OC_3F_7$ group wherein Y represents a hydrogen, fluorine, or chlorine atom, and p and q are respectively an integer of 0 to 10, Z represents a hydroxyl, morpholino, tertiary amino, or secondary amino group, $R^7$, $R^8$, and $R^9$ which may be the same or different represent a linear or branched alkyl group having 1 to 5 carbon atoms, and m is an integer of 5 to 1000.

7. A silica composite particle dispersion comprising the powdery silica composite particles according to claim 1 dispersed in a dispersion solvent.

8. A silica composite particle dispersion comprising the powdery silica composite particles according to claim 1 dispersed in a reaction solution obtained by adding acid or alkali to the reactant solution comprising:
   core silica particles of 5 to 200 nm in average particle size;
   alkoxysilane;
   a phosphonium salt ionic liquid represented by general formula (1):

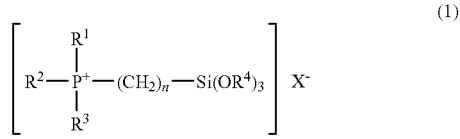

wherein $R^1$, $R^2$, and $R^3$ respectively represent a linear or branched alkyl group having 1 to 5 carbon atoms, $R^4$ represents a linear or branched alkyl group having 1 to 5 carbon atoms, n represents an integer of 1 to 8, and X represents an anionic group; and
   a reaction solvent, which hydrolyzes the alkoxysilane or which is a diluted solution of the reaction solution.

9. The silica composite particle dispersion according to claim 8, wherein the reactant solution further comprises a fluoroalkyl group-containing oligomer represented by general formula (2) or (3):

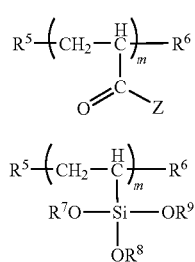

wherein $R^5$ and $R^6$ which may be the same or different represent a $-(CF_2)_p-Y$ group or $-CF(CF_3)-[OCF_2CF(CF_3)]_q-OC_3F_7$ group wherein Y represents a hydrogen, fluorine, or chlorine atom, and p and q are respectively an integer of 0 to 10, Z represents a hydroxyl, morpholino, tertiary amino, or secondary amino group, $R^7$, $R^8$, and $R^9$ which may be the same or different represent a linear or branched alkyl group having 1 to 5 carbon atoms, and m is an integer of 5 to 1000.

10. The silica composite particle dispersion according to claim 8, wherein the reaction solution is observed to have no precipitates after being centrifuged at an acceleration of 800 G for 30 minutes.

11. The silica composite particle dispersion according to claim 7, further comprises an ionic liquid.

12. A resin composition comprising the powdery silica composite particles according to claim 1.

13. The powdery silica composite particles according to claim 1, wherein the size of the powdery silica composite particles is 5 to 200 nm.

14. The powdery silica composite particles according to claim 1, wherein the size of the powdery silica composite particles is 5 to 60 nm.

15. The powdery silica composite particles according to claim 1, wherein the silica composite particles comprise the phosphonium salt ionic liquid represented by the general formula (1) at a content of 1% to 4% by weight in terms of the P atom.

* * * * *